(12) United States Patent
Ashizawa et al.

(10) Patent No.: US 7,191,502 B1
(45) Date of Patent: Mar. 20, 2007

(54) CURRENT COLLECTOR WITH PENETRATING HOLES OF COMPLICATED SHAPE FOR USE IN A SECONDARY BATTERY AND MANUFACTURING PROCESS THEREOF

(75) Inventors: Koichi Ashizawa, Kusatsu (JP); Atsushi Mori, Kusatsu (JP)

(73) Assignees: Nippon Foil Mfg. Co., Ltd., Osaka (JP); Nippaku Sangyo Co., Ltd., Osaka (JP)

( * ) Notice: Subject to any disclaimer, the term of this patent is extended or adjusted under 35 U.S.C. 154(b) by 0 days.

(21) Appl. No.: 09/124,925

(22) Filed: Jul. 29, 1998

(30) Foreign Application Priority Data

Aug. 14, 1997 (JP) ................................... 9-235387

(51) Int. Cl.
  *H01M 4/70* (2006.01)
  *H01M 4/82* (2006.01)
(52) U.S. Cl. ............................................ 29/2; 429/241
(58) Field of Classification Search ................ 429/233, 429/241, 94; 29/2
  See application file for complete search history.

(56) References Cited

U.S. PATENT DOCUMENTS 5,543,250 A * 8/1996 Yanagihara et al. ........ 429/241
5,578,398 A * 11/1996 Jenkins et al. ............... 429/233
5,626,989 A * 5/1997 Doundoulakis .............. 429/233
5,656,396 A * 8/1997 Kimura et al. ............... 429/241
5,682,928 A * 11/1997 Keith ........................... 141/33

* cited by examiner

Primary Examiner—Tracy Dove
(74) Attorney, Agent, or Firm—Bacon & Thomas, PLLC

(57) ABSTRACT

There is provided a current collector for use in a secondary battery on which active material coated on both sides of a metal foil are difficult to drop out.

The metal foil is provided with a large number of penetrating holes, the periphery of which are formed into a complicated shape, and active material, binder, etc. are intruded on each periphery, whereby the active material, etc. coated on both sides of the current collector consisting of the metal foil are prevented from dropping out. An area S of penetrating holes is in the range of 0.05 to 0.50 $mm^2$ a value M/N is in the range of 1.30 to 100 wherein M is the peripheral length of the penetrating holes and N is the peripheral length of a virtual circle having the area S of the penetrating hole. The current collector having such a large number of penetrating holes is obtained by passing a metal foil without a hole through between a concavo-convex roll having a large number of convex parts and a smoothing roll. If any burr is produced at each periphery edge of the penetrating holes, the current collector is further caused to pass through between a pair of metal smoothing rolls, whereby the burr produced on each periphery edge of the penetrating holes can be removed.

1 Claim, 1 Drawing Sheet

Penetrated Hole

Metallic Foil

Penetrated Hole

Metallic Foil

CURRENT COLLECTOR WITH PENETRATING HOLES OF COMPLICATED SHAPE FOR USE IN A SECONDARY BATTERY AND MANUFACTURING PROCESS THEREOF

BACKGROUND OF THE INVENTION

1. Technical Field of the Invention

The present invention relates to a current collector for use in a secondary battery, particularly in a lithium secondary battery or lithium-ion battery, and to a manufacturing process thereof.

2. Prior Art

A secondary battery essentially comprises a positive electrode, a negative electrode, a separator for insulating the positive electrode and the negative electrode from each other, and an electrolyte for making it possible to move ions between the positive electrode and the negative electrode. The positive electrode and the negative electrode are formed by coating the surface of a current collector of metal foil with an optional active material. For example, in the lithium ion battery, a current collector of aluminum foil coated with an active material containing lithium cobaltate, etc. is used as a positive electrode, and a current collector of copper foil coated with an active material containing non-graphitizable carbon, etc. is used as a negative electrode.

Generally, there has been a problem that when coating a surface of a metal foil such as aluminum foil or copper foil with active material the metal foil and the active material are difficult to integrate or attach to each other, and the active material is relatively easy to drop out. In the preparation of a secondary battery, if a part of the active material drops out at the time of winding the positive electrode and the negative electrode, there arises a problem of not being able to obtain a secondary battery of a desired capacity. If a part of the active material drops out after the preparation of the secondary battery, there arises another problem that the charge and discharge capacity of the secondary battery is gradually reduced.

To cope with this problem, it has been conventional to use a binder which in the active material has a good affinity with the metal foil. Further, it has been also conventional to use a metal foil a surface of which has a good affinity with an optional binder. For example, the Japanese Laid-Open Patent Publication (unexamined) Hei 7-201332 discloses a technique in which an azole film such as benzotriazole is formed on a surface of a copper foil, thereby improving the integration between a binder of the active material and the copper foil, and preventing the active material from dropping out.

On the other hand, being different from the mentioned method, another technique is also known, in which the active material is prevented from dropping out by forming penetrating holes through the metal foil and integrating the active material for coating front and back sides of the metal foil through these penetrating holes. It is certain that, in this method, as the active material, etc. on both sides are integrated through the penetrating holes, the active material, etc. are effectively prevented from dropping out. But the adherence between each periphery or each inner wall of the penetrating holes and the active material, etc. or adherence between the metal foil and the active material, etc. still remains insufficient, and therefore if a large external force is applied, there is a possibility that a part of the active material will drop out.

SUMMARY OF THE INVENTION

The present invention effectively prevents the active material from dropping out by improving the adherence between each periphery or each inner wall of the penetrating holes and the active material, etc. To improve adherence, the present invention adopts the following manner. That is, the active material is intruded to each periphery or each inner wall of the penetrating holes which are formed into a complicated shape (i.e., penetrating holes of complicated shape).

More specifically, the present invention relates to a current collector provided with penetrating holes of complicated shape for use in a secondary battery, and to a manufacturing process thereof, characterized in that the current collector comprises a metal foil provided with a large number of penetrating holes, and supposing that an area of a penetrating hole is S, a peripheral length of the penetrating hole is M, and a peripheral length (circumferential length) of a virtual circle having the area S of the penetrating hole is N, each penetrating hole satisfies the conditions of $0.05 \leq S \leq 50$ and $1.30 \leq M/N \leq 100$. The dimension of S is expressed in $mm^2$, and each dimension of M and N is Expressed in mm.

DESCRIPTION OF THE PREFERRED EMBODIMENTS

Figure 1:
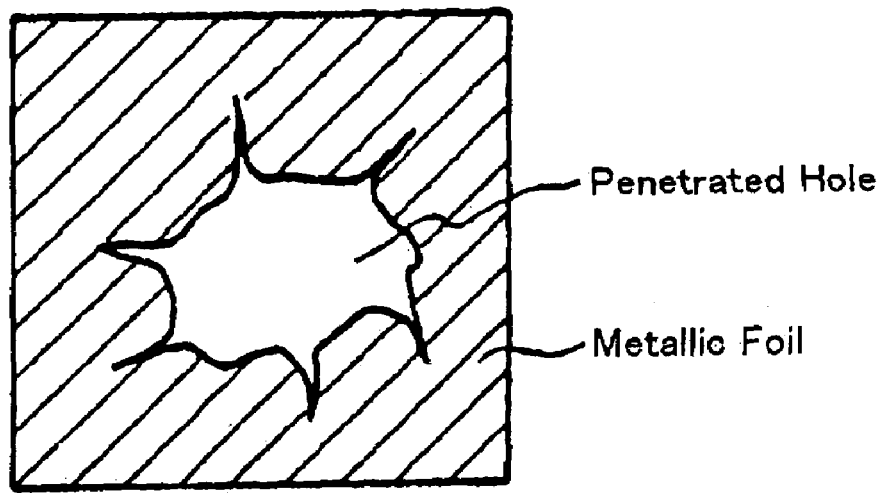
FIG. 1 is an enlarged view of a surface of a current collector according to an example of the present invention, showing schematically a shape of a penetrating hole.

In the present invention, an aluminum foil, an aluminum alloy foil, a copper foil or a copper alloy foil is used as a metal foil forming the current collector. Generally in the lithium secondary battery or lithium-ion battery, the aluminum foil or the aluminum alloy foil is used as a current collector, for forming the positive electrode, while the copper foil or the copper alloy foil is used as a current collector for forming the negative electrode. In the present invention, the current collector can be prepared by using a metal foil other than aluminum foil or copper foil. In the secondary battery, a metal other than aluminum or copper is also used to form a metal foil. The thickness of the current collector may be in the range of 5 to 100 μm, and is usually in the range of 8 to 30 μm. The current collector made of an aluminum foil used in the lithium secondary battery or lithium-ion battery is preferably in the range of 10 to 30 μm, and the current collector of a copper foil is preferably in the range of 8 to 25 μm. As for the copper foil, both rolled copper foil (obtained by a rolling method) and electrodeposited copper foil (obtained by an electrodepositing method) may be preferably used. The present invention is featured in that each penetrating hole which is provided through the current collector has a specific shape. First of all, the area S of each penetrating hole is in the range of 0.05 to 50 $mm^2$. The area, of the penetrating hole means an area occupied by each penetrating hole when the current collector is placed horizontally and seen from vertically above. Accordingly, the area S of a penetrating hole can be easily obtained by taking a microphotograph from vertically above and using such means as visual image analysis of the photographed penetrating hole. If the area of the penetrating hole is smaller than 0.05 mm$^2$, the active material, binder, etc. are difficult to get into the penetrating hole, the active material, etc., are difficult to introduce to the periphery or inner wall of the penetrated hole, the adherence between the current collector and the active material, etc. is lowered, and a part of the active material is easy to drop out, which is not desirable. If the area of the penetrating hole exceeds 50 mm$^2$, the total area of the penetrating holes in the current collector becomes excessively large, and the mechanical strength of the current collector is reduced; and there is a possibility that the current collector is fractured at the time of preparing the secondary battery by winding the current collector.

In the second place, supposing that a periphery length (circumferential length) of the penetrating hole is M, and a peripheral length of a virtual circle having the area S of the penetrating hole is N, a value M/N is required to be in the range of 1.30 to 100. In this respect, the periphery length M can be easily obtained by taking a microphotograph of each penetrating hole and measuring an actual size by means of visual image analysis. On the other hand, the peripheral length N of the virtual circle can be obtained by measuring the area S of the penetrating hole, calculating a value r from an expression S=$\pi r^2$, and further calculating $2\pi r$ which is N. In the present invention, the value M/N must be in the range of 1.30 to 100. If the value M/N is smaller than 1.30, any complicated shape of the periphery of the penetrating hole cannot be achieved, the active material, etc. are difficult to introduce into the periphery, the adherence between the end edge periphery and the active material, etc. becomes insufficient, and a part of the active material is easy to drop out, which is not desirable. If the value M/N is larger than 100, the effect of prevention of dropping out of the active material is saturated and no longer improved.

Figure 2:
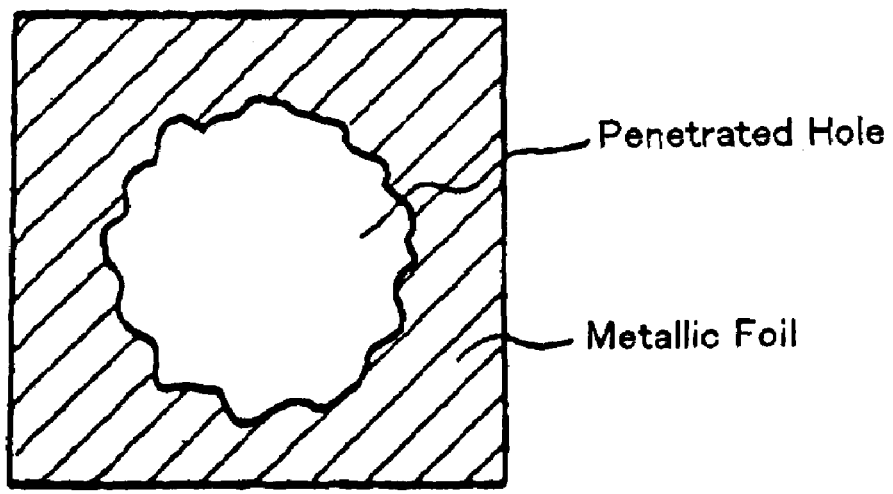
FIG. 2 is also an enlarged view of a surface of a current collector according to an example of the present invention, showing schematically a shape of another penetrating hole.

The shape of the penetration hole provided through the current collector according to the present invention is not a regular form such as a circle, an equilateral polygon, an equilateral square, an equilateral triangle, an ellipse, etc. but an irregular form of complicated shape as shown in FIGS. 1 and 2, for example. In the shape shown in FIG. 1, at the periphery of the penetrating hole, there are several portions each forming a wedge shape and intruding or extending into the metal foil. The active material, etc. intrude to these portions, whereby the adherence between the periphery and the active material, etc. is improved. In another shape shown in FIG. 2, at the periphery of the penetrating hole, there are indented portions, and the active material, etc. intrude to these indented portions, whereby the adherence between the periphery and the active material, etc. is improved. The shape of the penetrating holes in the present invention is not limited to that shown in FIGS. 1 and 2, and any other shape may be adopted as far as the value M/N is in the range of 1.30 to 100, as a matter of course. When the M/N remains in the mentioned range, each periphery of the penetrating holes becomes a relatively complicated shape, and the adherence between the periphery and the active material, etc. is improved. It is to be noted that the current collector is provided with a large number of such penetrating holes of complicated shape, and therefore a pitch between the penetrated holes which adjoin each other may be about 0.5 to 10 mm, and the density of the penetrating holes may be about 1 to 400 holes/cm$^2$.

The current collector for use in a secondary battery according to the present invention is useful as far as a large number of penetrating holes of complicated shape are provided, irrespective of the manufacturing method of the current collector. However, the following embossing method is most preferable as the manufacturing method. First, a metal foil without a hole such as copper foil without a hole or aluminum foil without a hole is prepared. In this respect, "without a hole" means that there is no penetrating hole having the mentioned area of 0.05 to 50 mm$^2$, and does not mean that there is no pinhole. Accordingly, even if there is any pinhole of a very small diameter, the metal foil having such a pinhole is classified into the metal foil without a hole.

The metal foil without a hole is caused to pass through and between a concavo-convex roll having a large number of convex parts and a smoothing roll under a predetermined pressure. The convex parts of the concavo-convex roll press the metal foil without a hole, whereby the metal foil without hole is broken in the pressed points. The operation of such breakage is different depending on the pressure. For example, if the pressure is set to be relatively low, the breakage shows a condition that the metal foil is torn off, and penetrating holes (of complicated shape) formed by tearing off the metal foil are obtained. That is, a penetrating hole as shown in FIG. 1 is obtained. On the other hand, if the pressure is set to be relatively high, the breakage shows a condition that the metal foil is punched, and penetrating holes (of complicated shape) formed by punching the metal foil are obtained. That is, a penetrated hole as shown in FIG. 2 is obtained. Differences in the operation of breakage when setting the pressure to a certain value occurs depending on kind of the metal foil, material of the concavo-convex roll, material of the smoothing roll, rotation speed of the concavo-convex roll and the smoothing roll, and is not fixed.

The material of the concavo-convex roll is generally a metal, and that of the smoothing roll is generally an elastic roll such as a rubber roll. As the smoothing roll is an elastic roll, the convex parts of the concavo-convex roll can easily intrude into the elastic roll, and the metal foil without a hole becomes easy to be provided with penetrating holes. A large number of convex parts are provided on the surface of the concavo-convex roll so that the metal foil without a hole is provided with a large number of penetrating holes. It is not always necessary that each top end of the convex parts is a complicated shape, but the top end may be a regular shape such as a circle, a square, a triangle, a polygon, etc. The top end of the convex parts may have any area, and is preferably in the range of about 0.05 to 50 mm$^2$ By passing the metal foil without a hole through between the concavo-convex roll and the smoothing roll, the metal foil without a hole is converted into the metal foil with penetrating holes of complicated shape, and sometimes any burrs may be produced on the back side (i.e., on the surface where the metal foil comes in contact with the smoothing roll) of the metal foil at each periphery of the penetrating holes. In particular, when the pressure between the concavo-convex roll and the smoothing roll is set to be relatively high, the burrs are easily produced. If there are any such burrs, the current collector for the positive electrode and the collector for the negative electrode may contact each other by passing through the separator and there is a possibility of a short circuit in the secondary battery. Accordingly, the burrs may be left as they are when the extent of projection of the burrs is small, but are generally removed. As a method for removing burrs, for example, the metal foil provided with the penetrating holes is caused to pass through between a pair of metal smoothing rolls. That is, as the pair of metal smoothing rolls press the metal foil provided with the penetrating holes at any pressure, burrs produced on each periphery of the penetrating holes are forcibly pushed into the inner wall side of the periphery. As a result, burrs produced on each periphery of the penetrating holes are successfully removed.

In the mentioned manner, a current collector comprising a metal foil provided with a large number of penetrating holes of relatively complicated shape is obtained. This current collector is preferably used as a current collector for a secondary battery such as lithium-ion battery, lithium metal battery, polymer battery, etc. The current collector is also preferably used as a current collector for a secondary battery other than the lithium secondary battery.

In the current collector for a secondary battery comprising a metal foil provided with a large number of penetrating holes according to the present invention, since each periphery of the penetrating holes has a complicated shape, the active material, binder, etc. coating both sides of the current collector intrude on each periphery or each inner wall of the penetrating holes, and the active material, etc. on both sides are integrated. Accordingly, an advantage is achieved such that the adherence between the active material, etc., and each periphery of the penetrating holes is improved, and the active material, etc. applied to both sides of the current collector are difficult to drop out.

As a result, at the time of winding the current collector (for the negative or positive electrode used in the secondary battery) coated with the active material, etc. and preparing a secondary battery, a further advantage is achieved such that very little the active material, etc. drops out, and a secondary battery having a desired capacity can be easily prepared. Furthermore, after preparing the secondary battery, the drop out of the active material, etc. or the separation of the active material, etc. and the current collector from each other can be successfully prevented, whereby reduction in the charge and discharge capacity is prevented and a life of the secondary battery is prolonged.

The current collector according to the present invention can be easily and reasonably obtained just by passing the metal foil without a hole through between the concavo-convex roll and the smoothing roll. By further passing through between a pair of metal smoothing rolls after passing through between the concavo-convex roll and the smoothing roll, even if any burrs are produced on each periphery edge of the penetrating holes, the burrs can be easily and reasonably removed. Consequently, by adopting the above-described method, the current collector according to the present invention can be efficiently obtained at a relatively low cost.

EXAMPLES

Several examples of the present invention are hereinafter described, but the present invention is not limited to these examples. The present invention should be understood or interpreted based on the idea that, as each periphery of a large number of penetrating holes provided through a current collector is formed into a specific complicated shape, the active material, etc. coating both ends of the current collector intrude on each periphery or each inner wall of the penetrating holes and become difficult to drop out.

Example 1

First, a rolled copper foil without a hole of 25 cm in width 300 m in length and 18 μm in thickness was prepared. This rolled copper foil was caused to pass through, between a later-described concavo-convex roll and a smoothing roll at a feed speed of 20 m/min under a pressure of 7.5 kgf/mm.

The mentioned concavo-convex roll has convex parts each of which adjoin each other at a pitch of 5 mm in both cross direction and length direction, and a top end of each convex part is formed into a circle having a diameter of 0.8 mm. This concavo-convex roll is made of a metal, and its roll diameter is 200 mm and its roll width is 300 mm. On the other hand, the smoothing roll is made of a rubber roll of which surface is coated with NBR (Neobutadiene Rubber), and its roll diameter is 250 mm and its width is 300 mm.

As a result, the rolled copper foil without a hole was provided with penetrating holes at the points corresponding to the convex parts of the concavo-convex roll. Each shape of the penetrated holes was similar to that shown in FIG. 1. Then, as a result of measuring and calculating an area S of each penetrating hole, a periphery length M of the penetrating hole, and a periphery length N of a virtual circle having the area S, it was found that $S=0.50$ $mm^2$ and $M/N=2.5$. When coating both sides of this current collector with a mixture of an active material comprising a non-graphitizable carbon and a fluoride binder, drop out of the active material was little, and a current collector preferably used as a negative electrode of a lithium-ion secondary battery was obtained.

Example 2

In the same manner as Example 1, except that the pressure between the concavo-convex roll and the smoothing roll was 20 kg/mm, a copper foil provided with penetrating holes at the points corresponding to the convex parts of the concavo-convex roll was obtained. Each shape of the penetrating holes was similar to that shown in FIG. 2, and relatively large burrs were formed on the back side of the copper foil (i.e., on the surface of the copper foil in contact with the smoothing roll) at each periphery of the penetrating holes. The copper foil with the penetrating holes was caused to pass through between a pair of metal smoothing rolls (of which each roll diameter was 250 mm and roll width was 300 mm) under a pressure of 4.4 kgf/mm at a feed speed of 20 m/min.

As a result, burrs formed on the back side of the copper foil at each periphery of the penetrating holes were almost removed. In the same manner as Example 1, S, M and N were measured and calculated, and it was found that $S=0.50$ $mm^2$ and $M/N=3.5$. When coating both sides of this current collector with a mixture of an active material comprising a non-graphitizable carbon and a fluoride binder, drop out of the active material was little, and a current collector preferably used as a negative electrode of a lithium-ion secondary battery was obtained.

Comparative Examples 1 TO 4

The same rolled copper foil as used in Example 1 was provided with a large number of circular penetrating holes of 0.50 $mm^2$ in area by punching, and a current collector was obtained (comparative Example 1). In the same manner, current collectors respectively provided with a large number of equilateral polygonal penetrating holes (Comparative Example 2), equilateral square penetrating holes (Comparative Example 3), and equilateral triangular penetrating holes (Comparative Example 4) were obtained. In the case of the circular penetrating holes, M/N was 1.00; in the case of the equilateral polygonal penetrating holes, M/N was 1.05; in case of the equilateral square penetrating holes, M/N was 1.13; and in case of the equilateral triangular penetrating holes, M/N was 1.29.

When coating both sides of each of each of these four kinds of current collectors with a mixture of an active material comprising a non-graphitizable carbon and a fluoride binder, drop out of the active material was greater as compared with Examples 1 and 2.

What is claimed is:

1. A method for producing a current collector for use in a secondary battery consisting of a metal foil provided with a plurality of penetrating holes, each of which has a complicated shape without burrs and satisfies the following expressions:

$$0.05 \leq S \leq 50$$

$$1.30 \leq M/N \leq 100$$

where: S is an area expressed in $mm^2$ of the penetrating hole, M is peripheral length expressed in mm of the penetrating hole, and N is a peripheral length expressed in mm of a virtual circle having the area S of the penetrating hole comprising the steps of:

passing a metal foil without a hole through between a concavo-convex roll having a plurality of convex parts and a smoothing roll under a given pressure; converting thereby portions of the metal foil without a hole and pressed by the convex parts of the concavo-convex roll into portions with penetrating holes; and passing the metal foil with the penetrating holes further through between a pair of metal smoothing rolls, whereby burrs produced at each periphery of the penetrating holes are removed.

* * * * *